(12) United States Patent
Wang et al.

(10) Patent No.: US 9,152,328 B2
(45) Date of Patent: Oct. 6, 2015

(54) REDUNDANT ARRAY OF INDEPENDENT DISKS VOLUME CREATION

(71) Applicant: LSI CORPORATION, San Jose, CA (US)

(72) Inventors: Jianning Wang, Norcross, GA (US); Daniel G. Samuelraj, Lawrenceville, GA (US); Subhankar Mukherjee, Suwanee, GA (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 208 days.

(21) Appl. No.: 13/937,821

(22) Filed: Jul. 9, 2013

(65) Prior Publication Data

US 2015/0012702 A1 Jan. 8, 2015

Related U.S. Application Data

(60) Provisional application No. 61/842,003, filed on Jul. 2, 2013.

(51) Int. Cl.
*G06F 3/06* (2006.01)
(52) U.S. Cl.
CPC ............ *G06F 3/0619* (2013.01); *G06F 3/0665* (2013.01); *G06F 3/0689* (2013.01)
(58) Field of Classification Search
None
See application file for complete search history.

(56) References Cited

U.S. PATENT DOCUMENTS

| 6,098,119 | A | 8/2000 | Surugucchi et al. | |
| 7,146,465 | B2 | 12/2006 | Korgaonkar | |
| 7,657,705 | B2 | 2/2010 | Mukherjee et al. | |
| 7,702,948 | B1 | 4/2010 | Kalman et al. | |
| 2007/0130424 | A1* | 6/2007 | Hashimoto et al. | 711/114 |
| 2007/0233949 | A1* | 10/2007 | Hart | 711/114 |
| 2008/0077736 | A1* | 3/2008 | Mukherjee et al. | 711/114 |
| 2012/0011313 | A1* | 1/2012 | Kopylovitz et al. | 711/113 |

OTHER PUBLICATIONS

"Sun StorageTek RAID Manager Software User's Guide," Chapter 4, Building a Storage Space, downloaded Jun. 3, 2013 http:/docs.oracle.com/cd/E19121-01/sf.x4440/820-1177-13/chapter4.html.

* cited by examiner

*Primary Examiner* — Aimee Li
*Assistant Examiner* — Dustin Bone
(74) *Attorney, Agent, or Firm* — Duft Bornsen & Fettig (57) ABSTRACT

Methods and structure for automatic creation of Redundant Array of Independent Disks (RAID) volumes are provided. The system comprises A RAID controller that includes a memory and a processor. The memory stores information describing storage devices of a storage system. The processor is able to receive a request to generate a RAID volume, to access the memory to identify a first group of storage devices that each have a first storage capacity, and to determine an expected size of a volume implemented by the first group. The processor is further able to access the memory to identify a second group of storage devices that each have a second storage capacity, to determine an expected size of a volume implemented by the first group and the second group, and to select one or more of the groups to create the requested volume based on the expected sizes.

20 Claims, 8 Drawing Sheets

| STORAGE GROUPS USED | VOLUME CAPACITY |
|---|---|
| 1 | 32 |
| 1, 2 | 36 |
| 1, 2, 3 | 16 |

RAID 10

| # OF DRIVES | # OF SPANS |
|---|---|
| 4 | 2 |
| 6 | 3 |
| 8 | 4 |
| 10 | 5 |
| 12 | 6 |
| 14 | 7 |
| 16 | 8 |
| 18 | 9 |
| 20 | 10 |
| 22 | 11 |
| 24 | 12 |
| 26 | 13 |
| 28 | 14 |

RAID 50

| # OF DRIVES | # OF SPANS |
|---|---|
| 6 | 2 |
| 8 | 2 |
| 9 | 3 |
| 10 | 2 |
| 12 | 2 |
| 14 | 2 |
| 15 | 3 |
| 16 | 2 |
| 18 | 2 |
| 20 | 2 |
| 21 | 3 |
| 22 | 2 |
| 24 | 2 |

RAID 60

| # OF DRIVES | # OF SPANS |
|---|---|
| 8 | 2 |
| 10 | 2 |
| 12 | 3 |
| 14 | 2 |
| 15 | 3 |
| 16 | 2 |
| 18 | 2 |
| 20 | 2 |
| 21 | 3 |
| 22 | 2 |
| 24 | 2 |
| 25 | 5 |
| 26 | 2 |

FIG. 8

REDUNDANT ARRAY OF INDEPENDENT DISKS VOLUME CREATION

CROSS REFERENCE TO RELATED APPLICATIONS

This document claims priority to U.S. Provisional Patent Application No. 61/842,003 (filed on Jul. 2, 2013) entitled REDUNDANT ARRAY OF INDEPENDENT DISKS VOLUME CREATION, which is hereby incorporated by reference.

FIELD OF THE INVENTION

The invention relates generally to storage systems, and more specifically to the creation of Redundant Array of Independent Disks (RAID) volumes within storage systems.

BACKGROUND

In order to store data for a host system, storage systems can include multiple storage devices. The storage devices can be operated together to form RAID volumes which enhance the speed of data retrieval and also ensure a level of redundancy for the data if a storage device should fail. Currently, RAID volumes can be defined based on input from a user specifically defining which storage devices to use and what level of RAID to implement. For example, a user may indicate that they wish to use a set of five specific disks to implement a RAID level 5 volume.

SUMMARY

Systems and methods herein provide for automated generation of RAID volumes based on input requesting the generation of a RAID volume, without requiring the selection of specific disks to implement the volume.

One exemplary embodiment is a RAID controller that includes a memory and a processor. The memory stores information describing storage devices of a storage system. The processor is able to receive a request to generate a RAID volume, to access the memory to identify a first group of storage devices that each have a first storage capacity, and to determine an expected size of a volume implemented by the first group. The processor is further able to access the memory to identify a second group of storage devices that each have a second storage capacity, to determine an expected size of a volume implemented by the first group and the second group, and to select one or more of the groups to create the requested volume based on the expected sizes.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
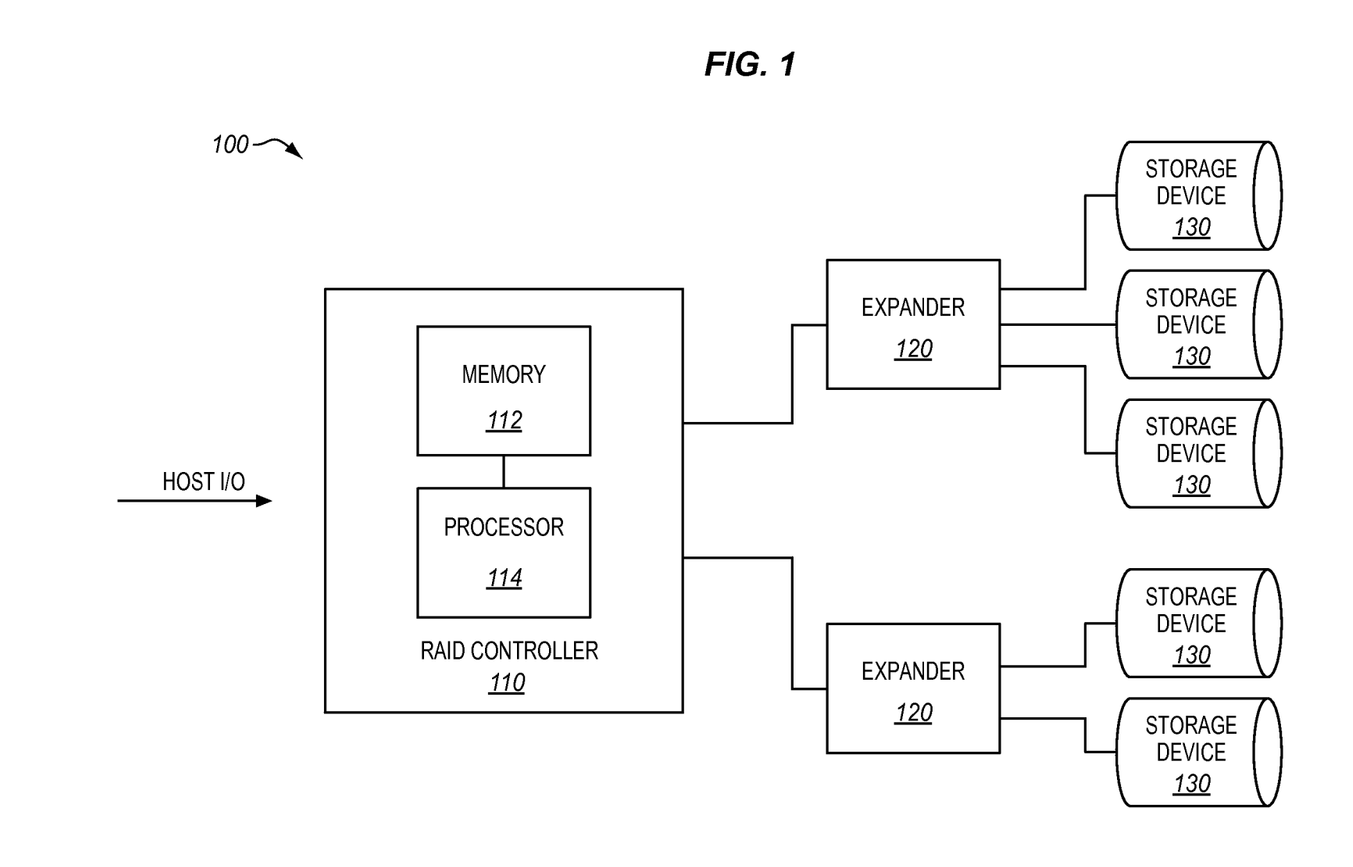
FIG. 1 is a block diagram of an exemplary storage system.

FIG. 1 is a block diagram of an exemplary storage system 100. Storage system 100 retrieves and stores data for a host system, such as a generic computer or server. In this embodiment, storage system 100 includes Redundant Array of Independent Disks (RAID) controller 110, which implements one or more RAID volumes on storages devices 130 via a switched fabric (e.g., expanders 120).

A switched fabric can comprise any suitable combination of communication channels operable to forward/route communications for storage system 100, for example, according to protocols for one or more of Small Computer System Interface (SCSI), Serial Attached SCSI (SAS), FibreChannel, Ethernet, Internet SCSI (ISCSI), etc. In one embodiment the switched fabric comprises a combination of SAS expanders that link to one or more storage devices operating as SAS and/or Serial Advanced Technology Attachment (SATA) targets.

Storage devices 130 implement the persistent storage capacity of storage system 100, and are capable of writing and/or reading data in a computer readable format. For example, storage devices 130 can comprise magnetic hard disks, solid state drives, optical media, etc. compliant with protocols for SAS, Serial Advanced Technology Attachment (SATA), Fibre Channel, etc.

Storage devices 130 implement storage space for one or more logical volumes (e.g., RAID volumes). A logical volume comprises allocated storage space and data available at storage system 100. A logical volume can be implemented on any number of storage devices 130 as a matter of design choice. Furthermore, storage devices 130 need not be dedicated to a single logical volume, and can store data for any number of logical volumes.

In this embodiment, RAID controller 110 includes memory 112 and processor 114. Memory 112 stores information describing storage devices 130. For example, the information kept in memory 112 can describe the address of each storage device 130, the capacity of each storage device 130 (e.g., the currently available capacity or the total capacity), the logical volumes presently implemented by storage devices 130, etc. Memory 112 comprises any suitable computer-readable media capable of storing such information for access by processor 114.

Processor 114 manages the general operations of RAID controller 110 in establishing and managing logical RAID volumes. In one embodiment processor 114 manages host Input/Output (I/O) requests directed to the RAID volumes by translating the I/O requests into SAS requests that are specific to storage system 100. Processor 114 can be implemented as custom circuitry, as a processor executing programmed instructions stored in program memory, or some combination thereof.

The particular arrangement, number, and configuration of components described herein is exemplary and non-limiting. Further details of the operations of storage system 100 are discussed below with regard to FIG. 2. Assume for this embodiment that a host system has transmitted a request to RAID controller 110 indicating that a logical volume with a specific RAID level (e.g., RAID 5) should be created from whatever storage devices 130 are available at storage system 100.

Figure 2:
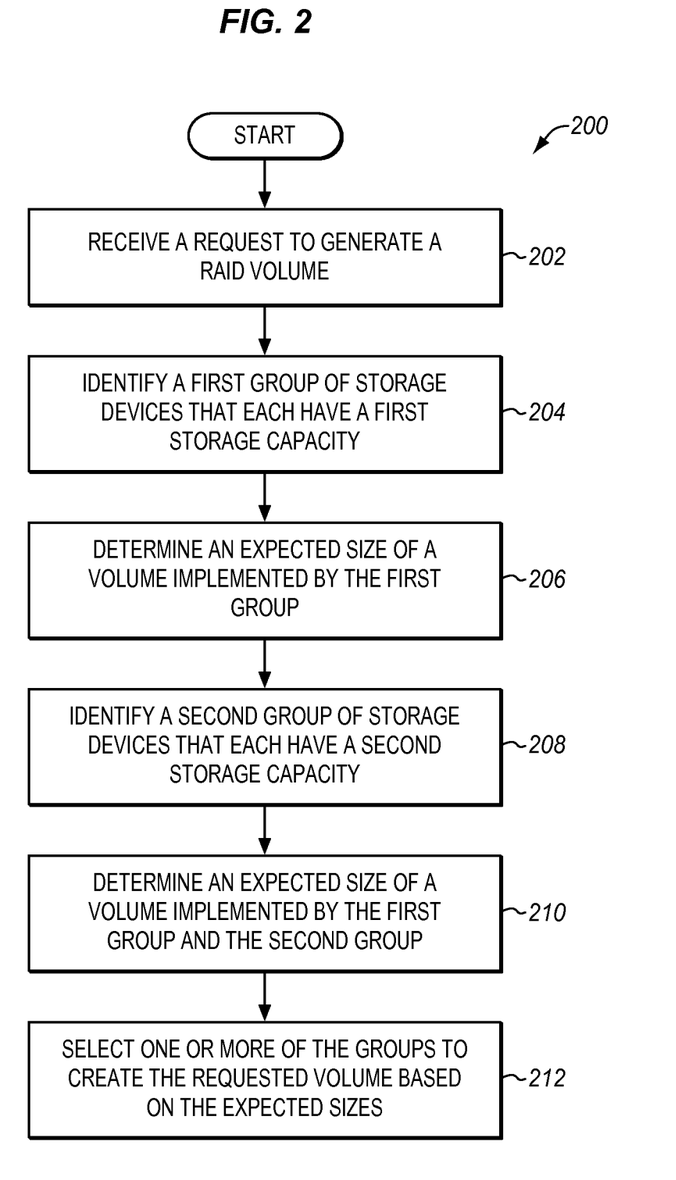
FIG. 2 is a flowchart describing an exemplary method of selecting groups of storage devices to implement a RAID volume.

FIG. 2 is a flowchart 200 describing an exemplary method of selecting a set of storage devices to implement a RAID volume. In step 202, processor 114 receives input from the host system requesting the generation of the RAID volume. This input can specify a RAID level to use for the volume (e.g., RAID 0, RAID 5, RAID 10, RAID 50, etc.). In step 204, processor 114 acquires information from memory 112 in order to identify a first group of storage devices 130 that each have the same storage capacity. For example, the identified storage devices 130 can each have the same amount of free space left, or can each have the same amount of total capacity. An available storage device can be any storage device 130 that still has free space left to store data for a RAID volume. In one embodiment, the first group of storage devices is composed of storage devices 130 that each have the largest storage capacity in storage system 100. For example, in a storage system made up of unused 1 Terabyte (TB), 2 TB, and 4 TB drives, processing system 220 can select the first group as the 4 TB drives.

In a further embodiment, the host request also indicates a set of prerequisite capabilities for storage devices used to implement the RAID volume. For example, the host may indicate that only "4K sector" drives should be used for the volume. In such cases, any available storage devices 130 that do not meet the criteria can be filtered out by processor 114 so that they are no longer considered available (e.g., they are not included in any groups of storage devices identified by processor 114).

In step 206, processor 114 determines an expected size of the volume if the volume was implemented by the first group of storage devices. The expected volume size can be a function of the number of storage devices 130 to be used, the amount of space used on each storage device 130, the level of overhead needed by the requested level of RAID, and other factors.

Processor 114 then reviews other storage devices 130 in order to determine which combination of storage devices yields the best RAID volume. In step 208 processor 114 identifies a second group of storage devices that each have a second storage capacity, and in step 210 processor 114 determines an expected size of a volume implemented by both the first group and the second group of storage devices.

For example, in a storage system made up of unused 1 TB, 2 TB, and 4 TB drives, the first group can be the available 4 TB drives, while the second group can be the available 2 TB drives. Since the same amount of space is used on each storage device that implements a RAID volume, a RAID volume with fewer large disks can in some scenarios yield a larger volume capacity than a RAID volume with the same number of large disks and a few additional small disks. A RAID volume made from two 4 TB drives can have a capacity of 8 TB (2 drives times 4 TB per drive), while a RAID volume made from two 4 TB drives and two 1 TB drives can have a capacity of 4 TB (4 drives time 1 TB per drive).

In step 212, processor 114 selects groups of storage devices 130 to implement the volume based on the expected volume sizes. For example, processor 114 can compare the expected volume sizes, and select the combination of groups that yields the largest volume size for the requested RAID volume. The processor 114 can create a RAID volume using the selected groups of storage devices.

Even though the steps of the methods herein are described with reference to storage system 100 of FIG. 1, these methods can be performed in other systems. The steps of the flowcharts described herein are not all inclusive and can include other steps not shown. The steps described herein can also be performed in an alternative order.

Figure 3:
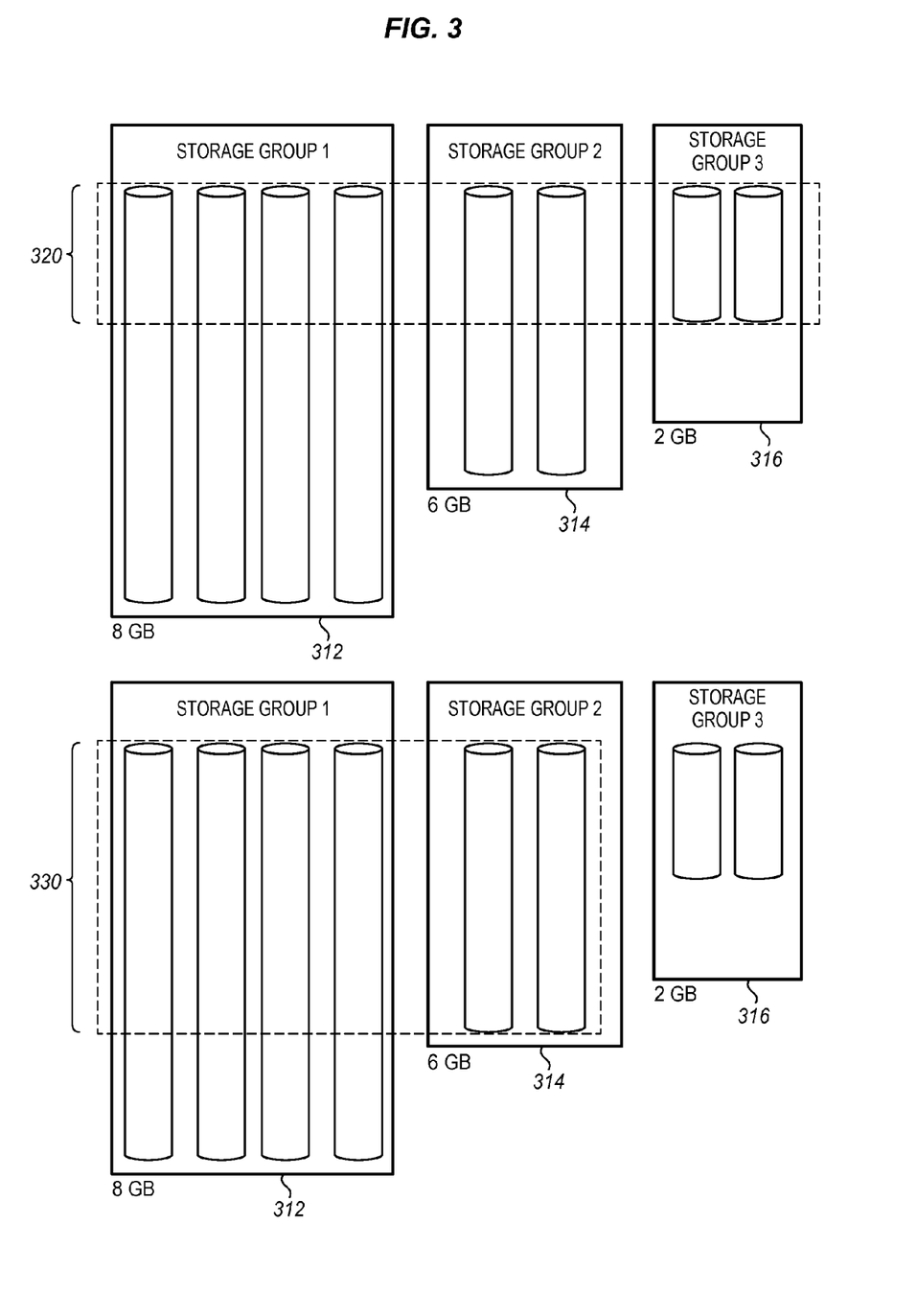
FIG. 3 is a block diagram illustrating how an exemplary RAID volume can be implemented on different groups of storage devices.

FIG. 3 is a block diagram illustrating how an exemplary RAID volume can be implemented on different groups of storage devices. In FIG. 3, the storage devices of a storage system are divided into storage groups. A storage group is a collection of the storage devices that have the same available capacity. As shown in FIG. 3, there are three storage groups in this embodiment. The first storage group 312 is made of four 8 GB disks, while the second storage group 314 is made of two 6 GB disks, and the third storage group 316 is made up of two 2 GB disks.

FIG. 3 shows two different ways that a RAID volume could be implemented using the storage groups. For example, the RAID volume can be implemented as shown in element 320, being spread across all eight disks and all three storage groups (using 2 GB from each disk). The RAID volume can alternatively be implemented as shown in element 330, being spread across two storage groups (using 6 GB from each disk), or can even simply be implemented using just storage group 1 (not shown). However, it is hard to intuitively determine which combination of disks will yield the greatest storage capacity for the volume.

If a RAID controller is attempting to maximize the size of the RAID volume, it can be beneficial to start by determining the expected capacity of the storage group having the largest individual capacity for each of its disks, and then iteratively adding the next largest storage group, the next largest storage group, and so on to determine which combination yields the largest volume capacity.

Figure 4:
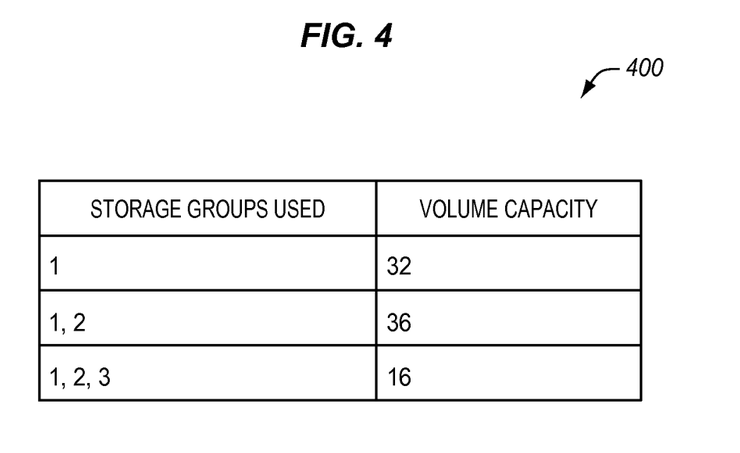
FIG. 4 is an exemplary table illustrating the volume capacity of a RAID volume implemented on different groups of storage devices as shown in FIG. 4.

FIG. 4 is an exemplary table illustrating the volume capacity of a RAID volume implemented on different groups of storage devices as shown in FIG. 3. FIG. 4 shows that the largest volume capacity for the specific combination of disks shown in FIG. 3 is the combination of the first and second storage groups.

EXAMPLES

In the following examples, additional processes, systems, and methods are described in the context of a RAID controller of a storage system.

Figure 5:
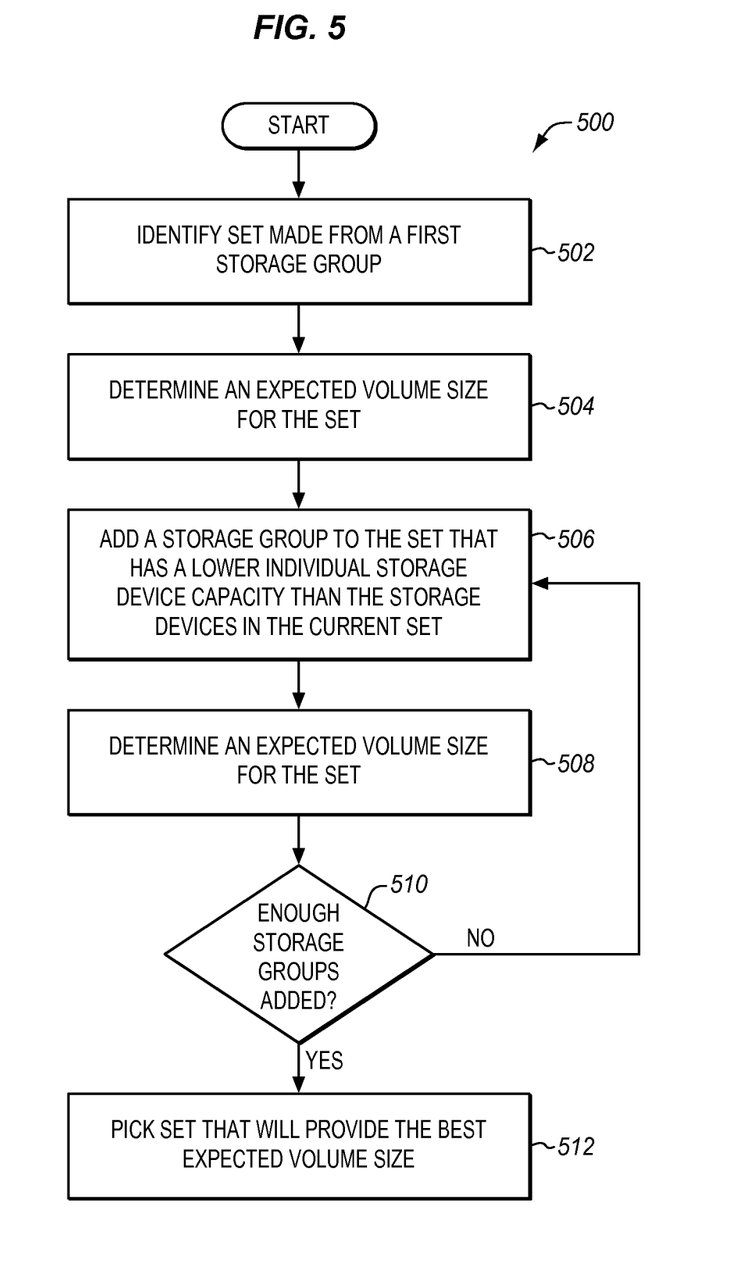
FIG. 5 is a flowchart describing an exemplary method of selecting groups of storage devices to implement a RAID volume.

FIG. 5 is a flowchart describing an exemplary method 500 of selecting groups of storage devices to implement a RAID volume. FIG. 5 illustrates how a RAID volume can be created from storage groups, where each storage group is a set of disks (in this example, all available disks at the storage system) that have the same available storage capacity.

In step 502, a processor of a RAID controller identifies a set of disks made from/composed of a first storage group. In this example the first storage group is the storage group that has the largest available capacity for each of its storage devices.

In step 504, the processor determines an expected volume size for the set of storage devices. In this example, the volume size is determined by multiplying the available space on each drive by the number of drives in the set, and then subtracting an amount for overhead space based on the RAID level.

In step 506, the processor adds a new storage group to the current set of storage devices. The new storage group is the storage group with the next largest available capacity for each of its storage devices. The processor then determines an expected volume size for the current set of storage devices in step 508. The expected volume size is determined by determining the capacity of each disk in the second storage group (i.e., the storage group with the lowest individual capacity per drive), multiplying this capacity by the total number of drives in the current set, and then subtracting some overhead amount of space. If there are no remaining storage groups to add to the set as determined in step 510, then the processor determines which set will provide the best size (e.g., greatest capacity) for the RAID volume in step 512, and implements the RAID volume using those storage groups. Alternatively, if storage groups remain (e.g., a third storage group, a fourth storage group, etc.), they are repeatedly added to the set and analyzed in steps 506-510.

Figure 6:
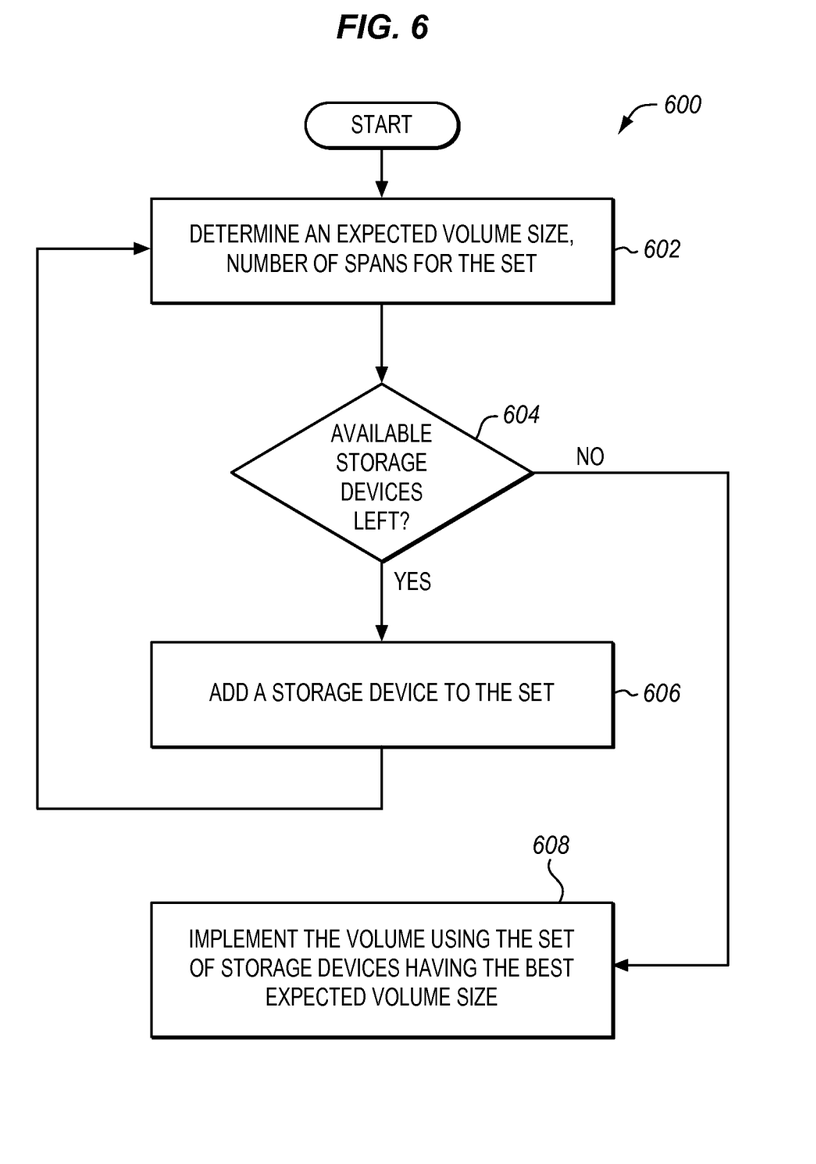
FIG. 6 is a flowchart describing an exemplary method of selecting a number of spans for a RAID volume.

FIG. 6 is a flowchart describing an exemplary method 600 of selecting a number of spans for a RAID volume. Method 600 can be implemented for example when a host system requests that the RAID volume be implemented as a multi-span volume if possible. According to method 600, in step 602 a processor of a RAID controller determines an expected volume size and number of spans for a current selected set of storage devices. The number of spans to implement for the RAID volume can be determined, for example, as a function of the total number of drives and the RAID level requested. For example, for a RAID 10 volume made from K disks, the number of spans for a non-prime K could be determined as the smallest factor of K that is not zero or one. The number of spans for a prime K can be defined as 1.

If there are any available storage devices left to add in step 604, then the processor adds a storage device in step 606 (e.g., the storage device with next largest available capacity, or an entire storage group of drives that each have the same next largest available capacity). Numbers of storage devices that are incompatible with the RAID level can be skipped during this process. The processor can then loop back to step 602 and determine the capacity of each combination of storage devices, and once all available storage devices have been reviewed, the processing system can implement the RAID volume using the set of storage devices having the best expected volume size (e.g., the largest volume size or the volume size closest to a target capacity).

Figure 7:
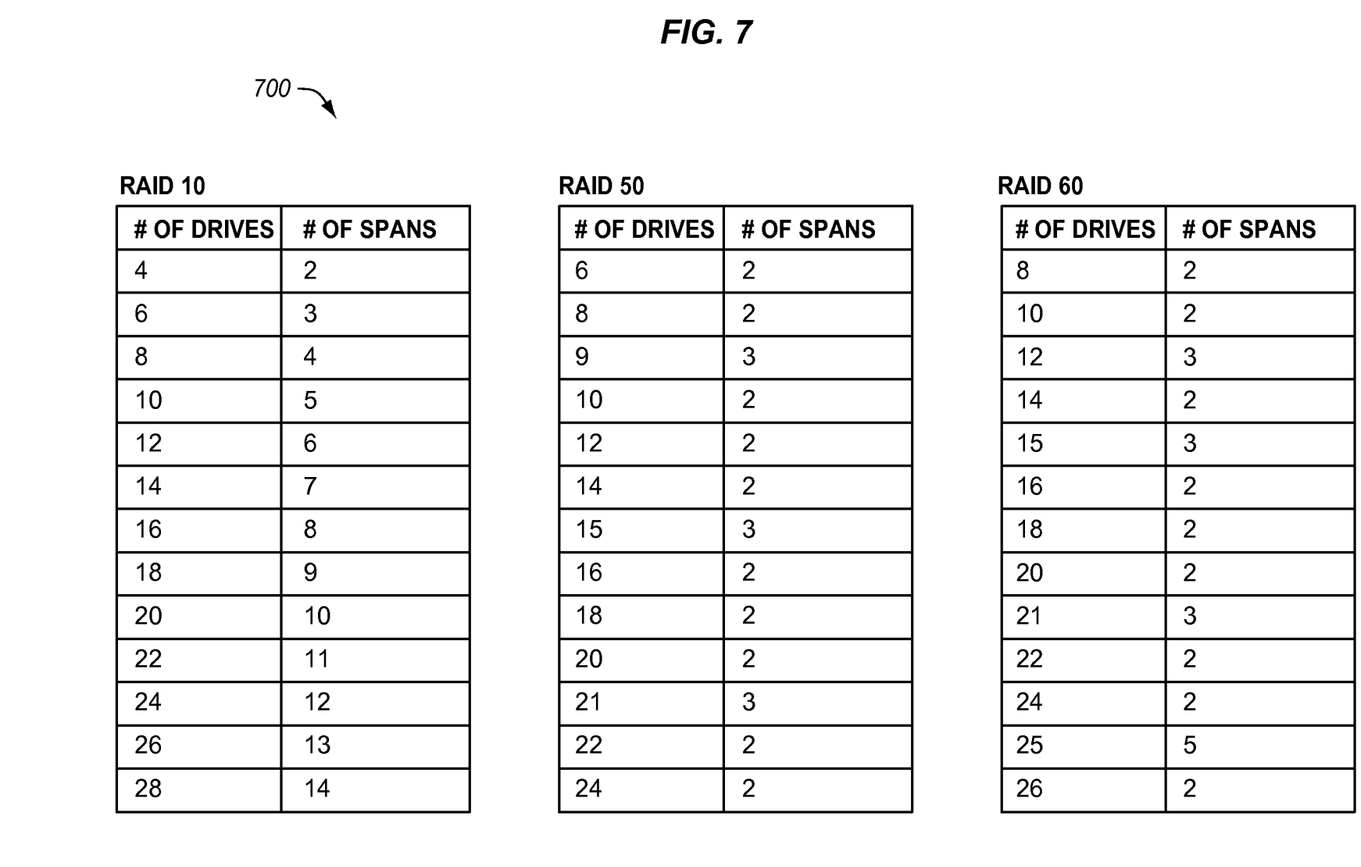
FIG. 7 is a block diagram including exemplary tables that correlate the number of drives in a given RAID level to the number of spans for a RAID level.

FIG. 7 is a block diagram 700 including exemplary tables that correlate the number of drives in a given RAID level to the number of spans to implement for the RAID level. FIG. 7 includes tables for RAID 10, 50, and 60 implementations.

Figure 8:
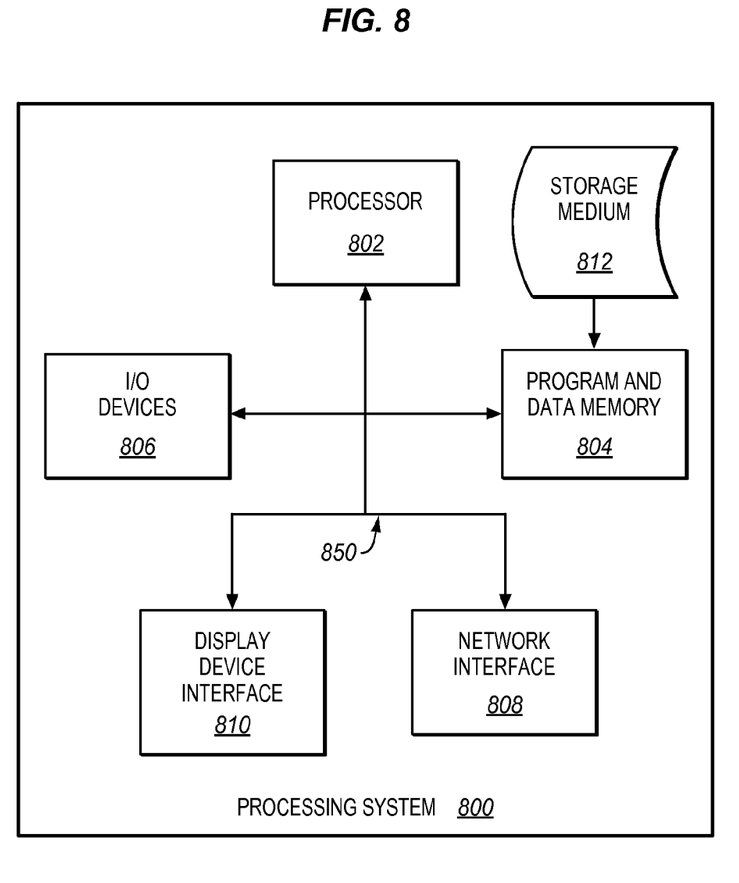
FIG. 8 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of RAID controller 110 to perform the various operations disclosed herein. FIG. 8 illustrates an exemplary processing system 800 operable to execute a computer readable medium embodying programmed instructions. Processing system 800 is operable to perform the above operations by executing programmed instructions tangibly embodied on computer readable storage medium 812. In this regard, embodiments of the invention can take the form of a computer program accessible via computer readable medium 812 providing program code for use by a computer (e.g., processing system 800) or any other instruction execution system. For the purposes of this description, computer readable storage medium 812 can be anything that can contain or store the program for use by the computer (e.g., processing system 800).

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 can also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 810 can be integrated with the system to interface to one or more display devices, such as printing systems and screens for presentation of data generated by processor 802.

What is claimed is:

1. A Redundant Array of Independent Disks controller comprising:

a memory that stores information describing storage devices of a storage system; and a processor operable to receive a request to generate a Redundant Array of Independent Disks volume, to access the memory to identify a first group of storage devices that each have a first storage capacity, to determine an expected size of a volume implemented by the first group, to access the memory to identify a second group of storage devices that each have a second storage capacity different than the first storage capacity, to determine an expected size of a volume implemented by the first group and the second group, and to select one or more of the groups to create the requested volume based on the expected sizes, wherein:

the processor is operable, in response to determining that the expected size of a volume implemented by the first group is larger than the expected size of a volume implemented by the first and second group, to select only the first group to create the requested volume.

2. The system of claim 1 wherein:

the processor is further operable to determine an expected size by assuming that each storage device implementing a volume would utilize the same amount of storage space for volume data.

3. The system of claim 1, wherein:
the processor is further operable to determine an expected size by multiplying a storage device capacity by the total number of storage devices implementing a volume, and then subtracting an overhead amount of storage space.

4. The system of claim 1, wherein:
the processor is further operable to access the memory to identify a third group of storage devices that each have a third storage capacity, and to determine an expected size of a volume implemented by the first group, the second group, and the third group.

5. The system of claim 1, wherein:
the processing system is further operable to identify a set of prerequisite capabilities for the storage devices, and to remove storage devices from the first group and the second group that do not have the prerequisite capabilities.

6. The system of claim 1, wherein:
the processing system is further operable to determine a number of spans for the volume based on a number of storage devices in the selected groups.

7. The system of claim 6, wherein:
the processing system is further operable to determine the number of spans is one when the number of storage devices is a prime number.

8. A method comprising:
receiving a request to generate a Redundant Array of Independent Disks volume;
identifying a first group of storage devices that each have a first storage capacity;
determining an expected size of a volume implemented by the first group;
identifying a second group of storage devices that each have a second storage capacity different than the first storage capacity;
determining an expected size of a volume implemented by the first group and the second group; and
selecting one or more of the groups to create the requested volume based on the expected sizes, wherein in response to determining that the expected size of the volume implemented by the first group is larger than the expected size of the volume implemented by the first and second group, the method comprises selecting only the first group to create the requested volume.

9. The method of claim 8 further comprising:
determining an expected size by assuming that each storage device implementing a volume would utilize the same amount of storage space for volume data.

10. The method of claim 8, further comprising:
determining an expected size by multiplying a storage device capacity by the total number of storage devices implementing a volume, and then subtracting an overhead amount of storage space.

11. The method of claim 8, further comprising:
accessing the memory to identify a third group of storage devices that each have a third storage capacity; and
determining an expected size of a volume implemented by the first group, the second group, and the third group.

12. The method of claim 8, further comprising:
identifying a set of prerequisite capabilities for the storage devices; and
removing storage devices from the first group and the second group that do not have the prerequisite capabilities.

13. The method of claim 8, further comprising:
determining a number of spans for the volume based on a number of storage devices in the selected groups.

14. The method of claim 13, further comprising:
determining the number of spans to be one when the number of storage devices is a prime number.

15. A non-transitory computer readable medium embodying programmed instructions which, when executed by a processor, are operable for performing a method comprising:
receiving a request to generate a Redundant Array of Independent Disks volume;
identifying a first group of storage devices that each have a first storage capacity;
determining an expected size of a volume implemented by the first group;
identifying a second group of storage devices that each have a second storage capacity different than the first storage capacity;
determining an expected size of a volume implemented by the first group and the second group; and
selecting one or more of the groups to create the requested volume based on the expected sizes, wherein in response to determining that the expected size of the volume implemented by the first group is larger than the expected size of the volume implemented by the first and second group, the method comprises selecting only the first group to create the requested volume.

16. The medium of claim 15, wherein the method further comprises:
determining an expected size by assuming that each storage device implementing a volume would utilize the same amount of storage space for volume data.

17. The medium of claim 15, wherein the method further comprises:
determining an expected size by multiplying a storage device capacity by the total number of storage devices implementing a volume, and then subtracting an overhead amount of storage space.

18. The medium of claim 15, wherein the method further comprises:
accessing the memory to identify a third group of storage devices that each have a third storage capacity; and
determining an expected size of a volume implemented by the first group, the second group, and the third group.

19. The medium of claim 15, wherein the method further comprises:
identifying a set of prerequisite capabilities for the storage devices; and
removing storage devices from the first group and the second group that do not have the prerequisite capabilities.

20. The medium of claim 15, wherein the method further comprises:
determining a number of spans for the volume based on a number of storage devices in the selected groups.

* * * * *